(12) United States Patent
Huang

(10) Patent No.: US 9,465,222 B2
(45) Date of Patent: Oct. 11, 2016

(54) SIX-PRIMARY SOLID STATE ILLUMINATOR

(71) Applicant: Delta Electronics, Inc., Taoyuan (TW)

(72) Inventor: June Jei Huang, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 38 days.

(21) Appl. No.: 14/684,946

(22) Filed: Apr. 13, 2015

(65) Prior Publication Data
US 2016/0139419 A1     May 19, 2016

(51) Int. Cl.
| H04N 9/07 | (2006.01) |
| G02B 27/14 | (2006.01) |
| G02B 27/22 | (2006.01) |
| H04N 13/04 | (2006.01) |
| G03B 21/20 | (2006.01) |
| G02B 27/28 | (2006.01) |
| G02B 27/26 | (2006.01) |
| H04N 9/097 | (2006.01) |
| G02B 5/30 | (2006.01) |

(52) U.S. Cl.
CPC ......... *G02B 27/2207* (2013.01); *G02B 27/141* (2013.01); *G02B 27/149* (2013.01); *G02B 27/26* (2013.01); *G02B 27/283* (2013.01); *G03B 21/204* (2013.01); *H04N 9/097* (2013.01); *H04N 13/0422* (2013.01); *H04N 13/0431* (2013.01); *H04N 13/0459* (2013.01); *G02B 5/3058* (2013.01)

(58) Field of Classification Search
CPC .. H04N 9/097; G02B 27/123; G02B 27/145; G02B 27/149; G02B 27/283
USPC ........ 348/336, 337, 338, 340, 278; 362/337; 359/618, 629, 630; 353/33
See application file for complete search history.

(56) References Cited

U.S. PATENT DOCUMENTS

| 6,995,917 B1* | 2/2006 | Sampsell ............. G02B 27/123 348/E5.141 |
| 7,327,521 B2* | 2/2008 | Tani ..................... G02B 27/283 348/336 |
| 2007/0127121 A1 | 6/2007 | Maximus et al. |
| 2010/0208342 A1 | 8/2010 | Olsen |

* cited by examiner

*Primary Examiner* — Audrey Y Chang
(74) *Attorney, Agent, or Firm* — Muncy, Geissler, Olds & Lowe, P.C.

(57) ABSTRACT

A six-primary solid state illuminator is provided, including a blue light output unit. The blue light output unit continuously outputs a first blue light and a second blue light simultaneously. The wavelength of the first blue light differs from the wavelength of the second blue light. In a first mode, the first blue light and the second blue light are modulated into S-polarized and are output as a first combined light. In a second mode, the first blue light and the second blue light are modulated into P-polarized and are output as a second combined light.

10 Claims, 8 Drawing Sheets

SIX-PRIMARY SOLID STATE ILLUMINATOR

CROSS REFERENCE TO RELATED APPLICATIONS

This application claims priority of Taiwan Patent Application No. 103139337, filed on Nov. 13, 2014, the entirety of which is incorporated by reference herein.

BACKGROUND OF THE INVENTION

1. Field of the Invention

The present invention relates to a six-primary solid state illuminator, and in particular to a stereoscopic six-primary solid state illuminator

2. Description of the Related Art

By exploiting the binocular parallax of humans, a stereoscopic display device provides two slightly different images to the respective left and right eyes of an observer so as to generate a stereoscopic image. There are several methods of providing the different images, and in general stereoscopic display technologies include polarization 3D technology, anaglyphic 3D technology, and wavelength multiplexing 3D technology.

The stereoscopic display device with the wavelength multiplexing technology generates a stereoscopic image by providing images with different wavelength ranges to observers. The general color display device produces various colors in the color space by mixing the additive primary colors, i.e. red (R), green (G), and blue (B). Therefore, the stereoscopic display device with the wavelength multiplexing technology can produce left-eye images with a set of primary colors R1, G1, and B1, and right-eye images with the other set of primary colors R2, G2, and B2, respectively.

A conventional stereoscopic display device with the wavelength multiplexing technology produces two sets of three primary colors by using two light sources which not only enlarge the size of the device, but also cause an alignment problem between two sets of images. Therefore, the industry is constantly striving to ameliorate the aforementioned disadvantages when the size of the stereoscopic display device is reduced.

BRIEF SUMMARY OF THE INVENTION

A six-primary solid state illuminator is provided. The six-primary solid state illuminator includes a blue light output unit, a red light source, a first photoinduced element, a second photoinduced element, a first optical module, a second optical module, a band filter and a prism unit. The blue light output unit continuously outputs a first blue light and a second blue light simultaneously, wherein a wavelength of the first blue light is different from a wavelength of the second blue light, wherein in a first mode, the first blue light and the second blue light are modulated into S-polarized and are output as a first combined light, and in a second mode, the first blue light and the second blue light are modulated into P-polarized and are output as a second combined light. The red light source provides a red light. In the first mode, the first combined light enters the first optical module, and induces the first photoinduced element to generate a yellow light, and the yellow light and the first combined light pass through the first optical module and the band filter, the yellow light and the first combined light are filtered by the band filter and become a first primary combined light, and the first primary combined light is output through the prism unit. In the second mode, the second combined light enters the second optical module, and induces the second photoinduced element to generate a green light, and the red light, the green light and the second combined light pass through the second optical module and the band filter, the red light, the green light and the second combined light are filtered by the band filter and become a second primary combined light, and the second primary combined light is output through the prism unit.

Utilizing the six-primary solid state illuminator of the embodiment of the invention, the first and second photoinduced elements are induced by the continuously powered first and second blue light sources, and the green light and the yellow light induced from the first and second photoinduced elements can be increased, and the system brightness is improved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Considering in the conventional six-primary solid state illuminator, the primary lights (red, blue and green) are provided by laser sources. The green laser source is expensive and has poor efficiency, which increases the cost of the whole six-primary solid state illuminator. Additionally, to provide two independent light sources, the waveband of one of the red laser source should be differentiate from the waveband of the other red laser source, and the cost of the whole six-primary solid state illuminator is further increased.

The embodiment of the invention utilizes the laser sources and the photoinduced elements as light sources, wherein a portion of the laser provided by the laser sources is utilized to induce the photoinduced elements, and the light induced thereby combines the remaining portion of laser to be output. In the embodiment of the invention, a band filter is utilized to separate two primary combinations with different wavebands. The two primary combinations of different modes respectively become left-eye images and right-eye images to generate a stereoscopic image (controlled by a controller).

Figure 1:
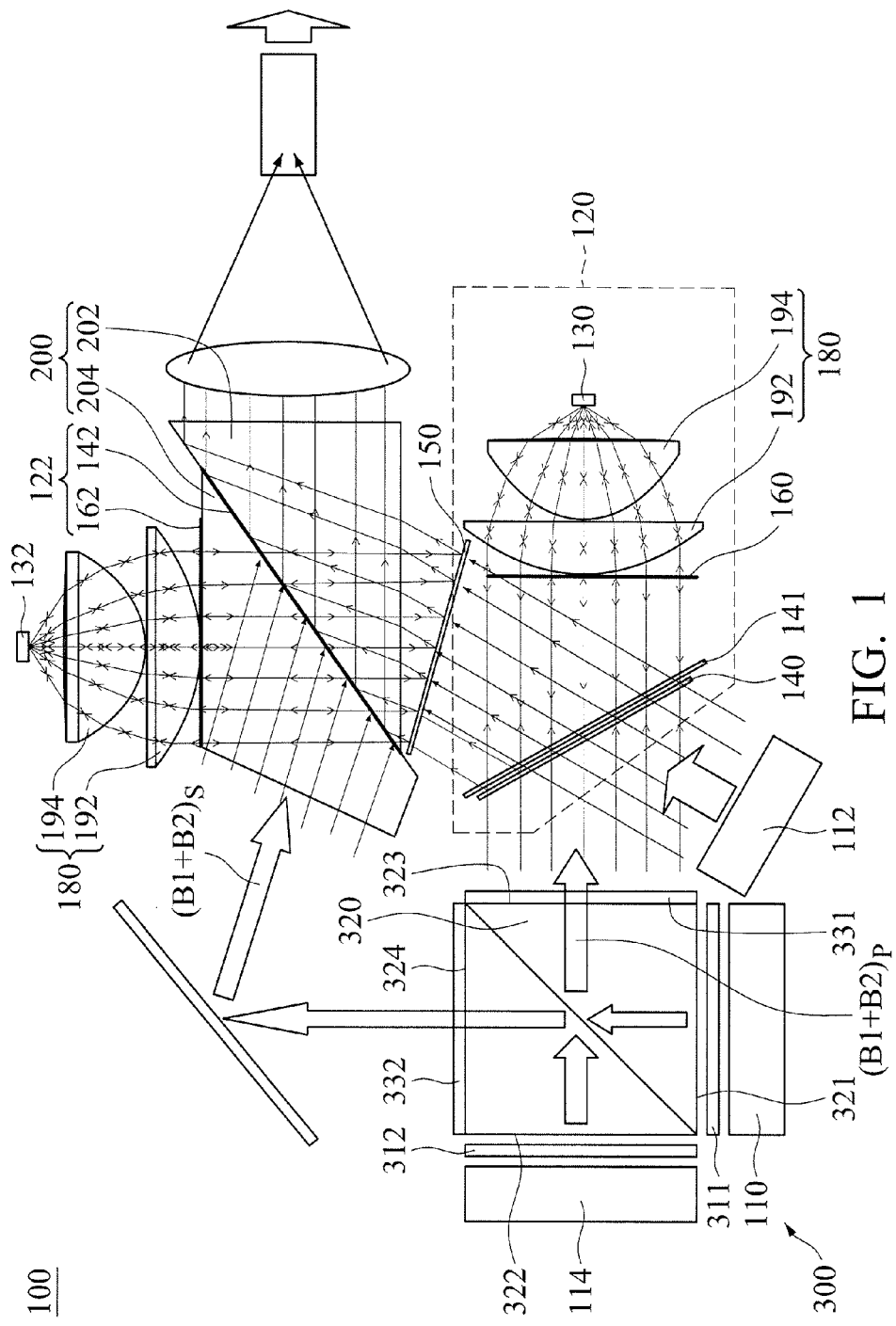
FIG. 1 shows a six-primary solid state illuminator of an embodiment of the invention.

FIG. 1 shows a six-primary solid state illuminator of an embodiment of the invention. The six-primary solid state illuminator 100 comprises a blue light output unit 300, a red light source 112, a first photoinduced element 132, a second photoinduced element 130, a first optical module 122, a second optical module 120, a band filter 150 and a prism unit 200.

With reference to FIG. 1, the blue light output unit 300 comprises a first blue light source 110, a second blue light source 114, a first light modulation element 311, a second light modulation element 312, a polarization beam splitter 320, a first half-wave plate 331 and a second half-wave plate 332. The first half-wave plate 331 and the second half-wave plate 332 are color selective half-wave plates. The first blue light source 110 provides a first blue light B1. The first light modulation element 311 polarizes the first blue light B1. The second blue light source 114 provides a second blue light B2. The second light modulation element 312 polarizes the second blue light B2. The PBS 320 comprises a first input surface 321 a second input surface 322, a first output surface 323 and a second output surface 324. The first half-wave plate 331 is corresponding to the first output surface 323. The second half-wave plate 332 is corresponding to the second output surface 324.

In a first mode, the first blue light B1 is modulated by the first light modulation element 311 into P-polarized, the first blue light B1 enters the first input surface 321, and passes through the polarization beam splitter 320, and is modulated by the second half-wave plate 332 into S-polarized. The second blue light B2 is modulated by the second light modulation element 312 into S-polarized, the second blue light B2 enters the second input surface 322, and is reflected by the polarization beam splitter 320, and the first combined light (the S-polarized first blue light B1 and second blue light B2) is output from the blue light output unit 300.

In a second mode, the first blue light B1 is modulated by the first light modulation element 311 into S-polarized, the first blue light B1 enters the first input surface 321, and is reflected by the polarization beam splitter 320, and is modulated by the first half-wave plate 331 into P-polarized. The second blue light B2 is modulated by the second light modulation element 312 into P-polarized, the second blue light B2 enters the second input surface 322, and passes through the polarization beam splitter 320, and the second combined light (the P-polarized first blue light B1 and second blue light B2) is output from the blue light output unit 300.

In one embodiment, the first blue light source 110 is a laser light source, and a wave crest of the wave length thereof is between 442 nm and 448 nm. The second blue light source 114 is a laser light source, and a wave crest of the wave length thereof is between 463 nm and 467 nm.

The red light source 112 provides red light. In one embodiment, the red light source 112 is a laser light source, and a wave crest of the wave length thereof is between 637 nm and 641 nm.

The first photoinduced element 132 is induced to generate a yellow light, wherein the first photoinduced element 132 is made of yellow phosphor powder, and a waveband of the yellow light is between 480 nm and 700 nm.

The second photoinduced element 130 is induced to generate a green light, wherein the second photoinduced element 130 is made of green phosphor powder, and a waveband of the green light is between 470 nm and 700 nm.

Figure 2:
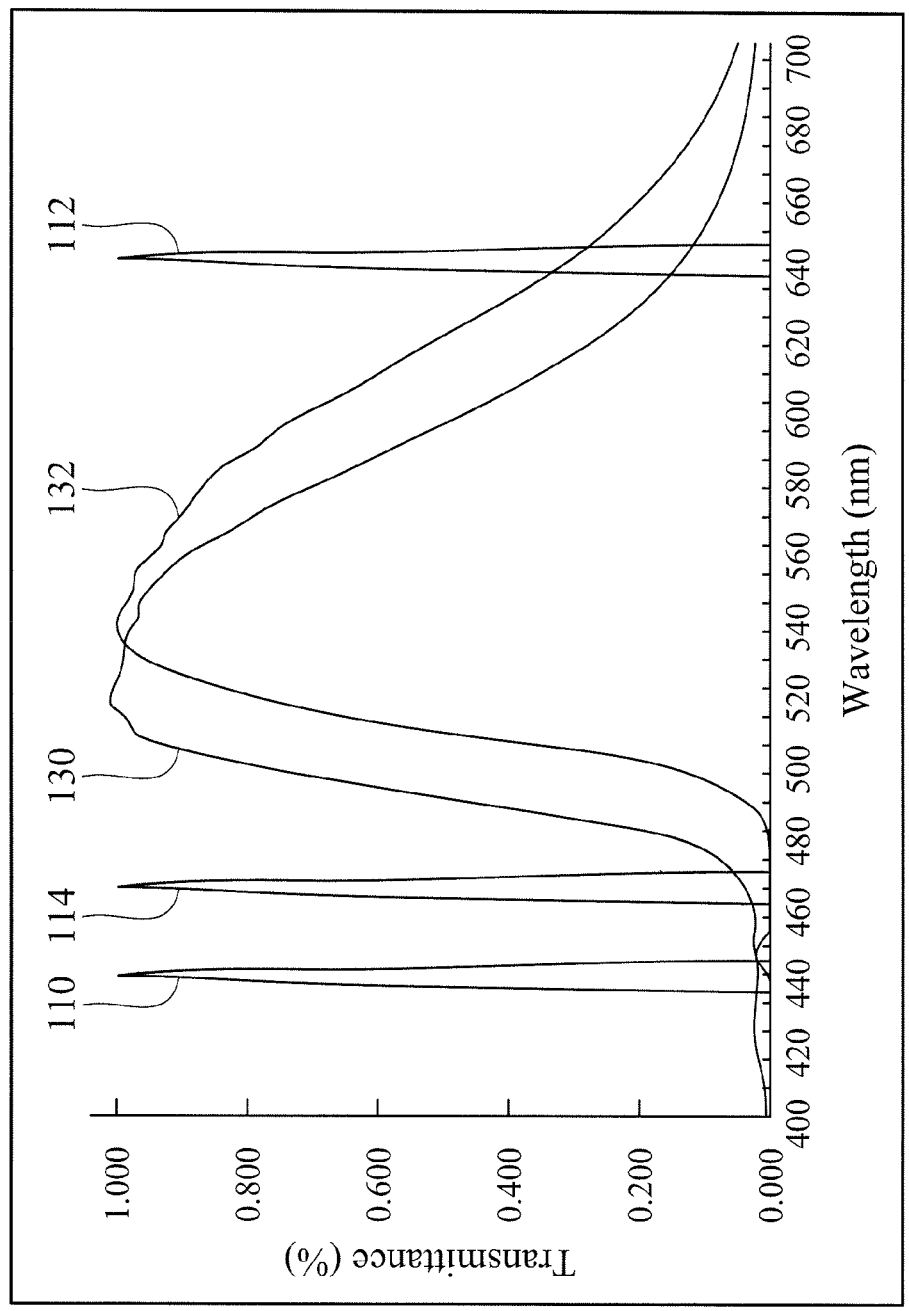
FIG. 2 is a frequency spectrum of the six-primary solid state illuminator of the embodiment of the invention.

In the embodiment above, the wavebands of the lights provided by the laser sources are not overlapped with each other, and the wavebands of the lights provided by the phosphor powder are partially overlapped with each other. FIG. 2 is a frequency spectrum of the six-primary solid state illuminator of the embodiment of the invention. In FIG. 2, the order of the wavelength of the light sources from short to long is first blue light source 110, second blue light source 114, the second photoinduced element (green light) 130, the first photoinduced element (yellow light) 132 and the red light source 112.

The first optical module 122 guides the S-polarized first blue light B1 and second blue light B2 output from the blue light output unit 300 and the yellow light induced by the first photoinduced element 132 (first mode).

The second optical module 120 guides the P-polarized first blue light B1 and second blue light B2 output from the blue light output unit 300, the red light provided by the red light source 112 and the green light induced by the second photoinduced element 130 (second mode).

The second optical module 120 guides the P-polarized first blue light B1 and second blue light B2 output from the blue light output unit 300 to induce the second photoinduced element 130, and guides the P-polarized first blue light B1 and second blue light B2 output from the blue light output unit 300, the red light provided by the red light source 112 and the green light induced by the second photoinduced element 130 to travel in the same direction. The second optical module 120 comprises a second PBS 140, a green reflector 141, a second wave plate 160 and a lens unit 180.

Figure 3:
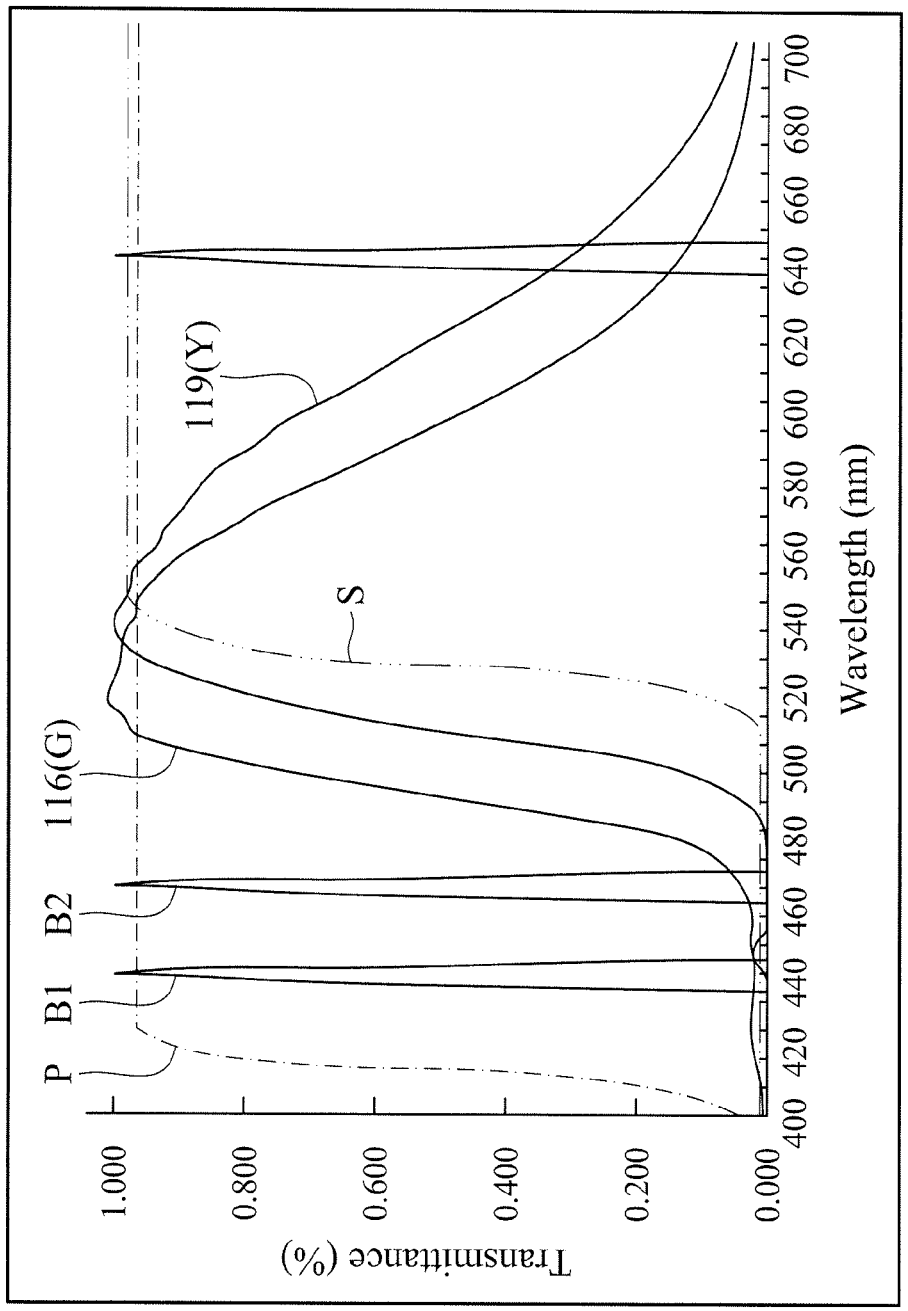
FIG. 3 is a transmission frequency spectrum of the second PBS (wire-grid PBS)

FIG. 3 is a transmission frequency spectrum of the second PBS 140. The second PBS 140 has different transmission frequency spectrums for the P-polarized and the S-polarized lights. To clarify the description, the wavebands of the first blue light B1 and second blue light B2 output from the blue light output unit 300, the red light provided by the red light source 112 and the green light induced by the second photoinduced element 130 are labeled in FIG. 3.

The P-polarized first blue light B1 and second blue light B2 output from the blue light output unit 300 (second mode) pass through the second PBS 140.

The red light provided by the red light source 112 also can pass through the second PBS 140.

Figure 4:
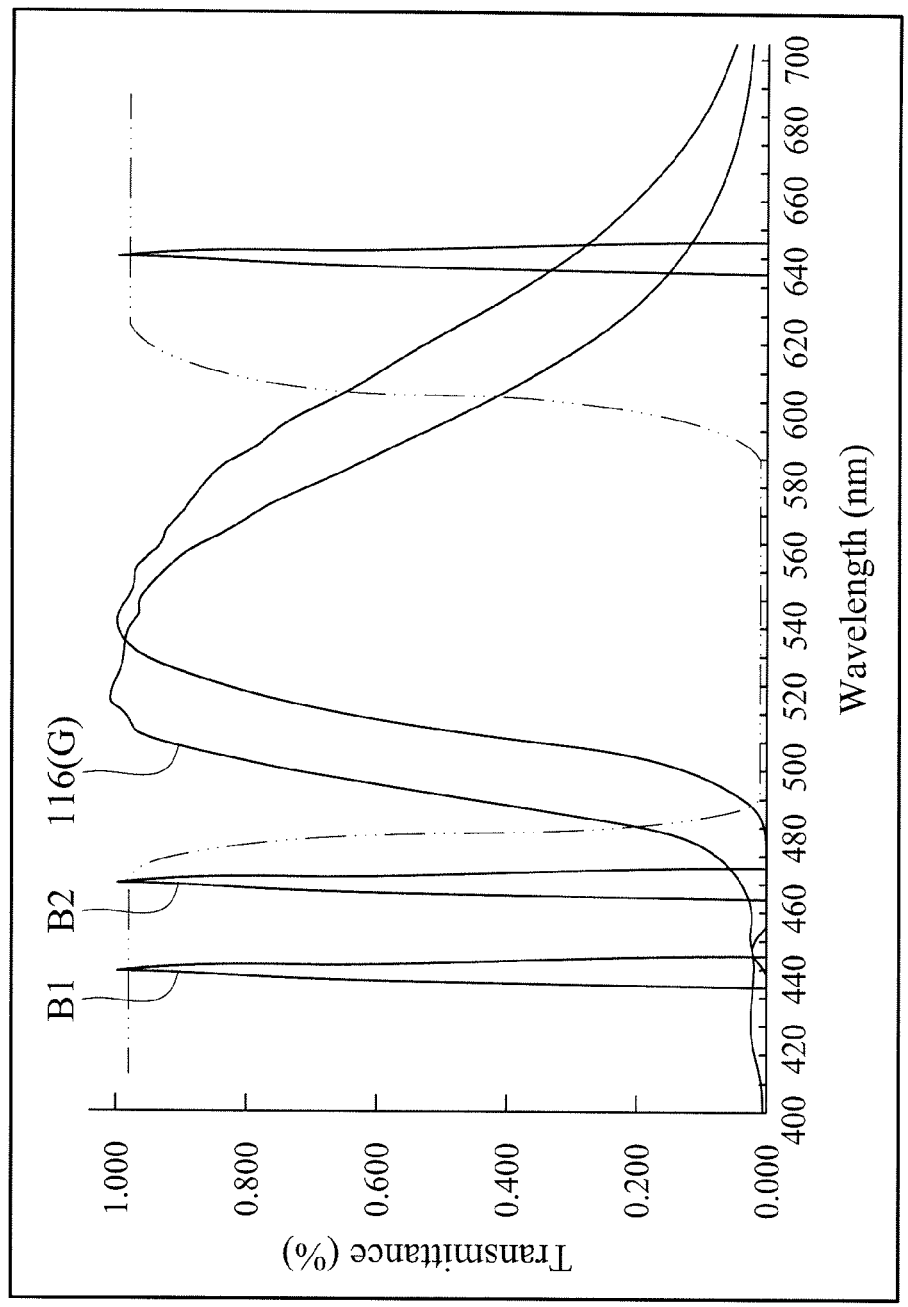
FIG. 4 is a transmission frequency spectrum of the green light reflector.

The green light induced by the second photoinduced element 130 is reflected by the green light reflector 141 before contacting the second PBS 140. FIG. 4 is a transmission frequency spectrum of the green light reflector 141.

With reference to FIG. 1, the second wave plate 160 of the second optical module 120 is quarter-wave plate. After the light passes through the second plate 160, the light has a quarter-wavelength phase difference. The lens unit 180 comprises a first lens 192 and a second lens 194. The first lens 192 and the second lens 194 are arranged to focus the light (which travel toward the second photoinduced element 130) on the second photoinduced element 130. Similarly, when the light is emitted from the second photoinduced element 130, the lens unit 180 guides and spreads the lights.

The first optical module 122 guides the S-polarized first blue light B1 and second blue light B2 output from the blue light output unit 300 to induce the first photoinduced element 132, and guides the S-polarized first blue light B1 and second blue light B2 output from the blue light output unit 300 and the yellow light induced by the first photoinduced element 132 to travel in the same direction. The first optical module 122 comprises a first PBS 142, a first wave plate 162 and the lens unit 180.

Figure 5:
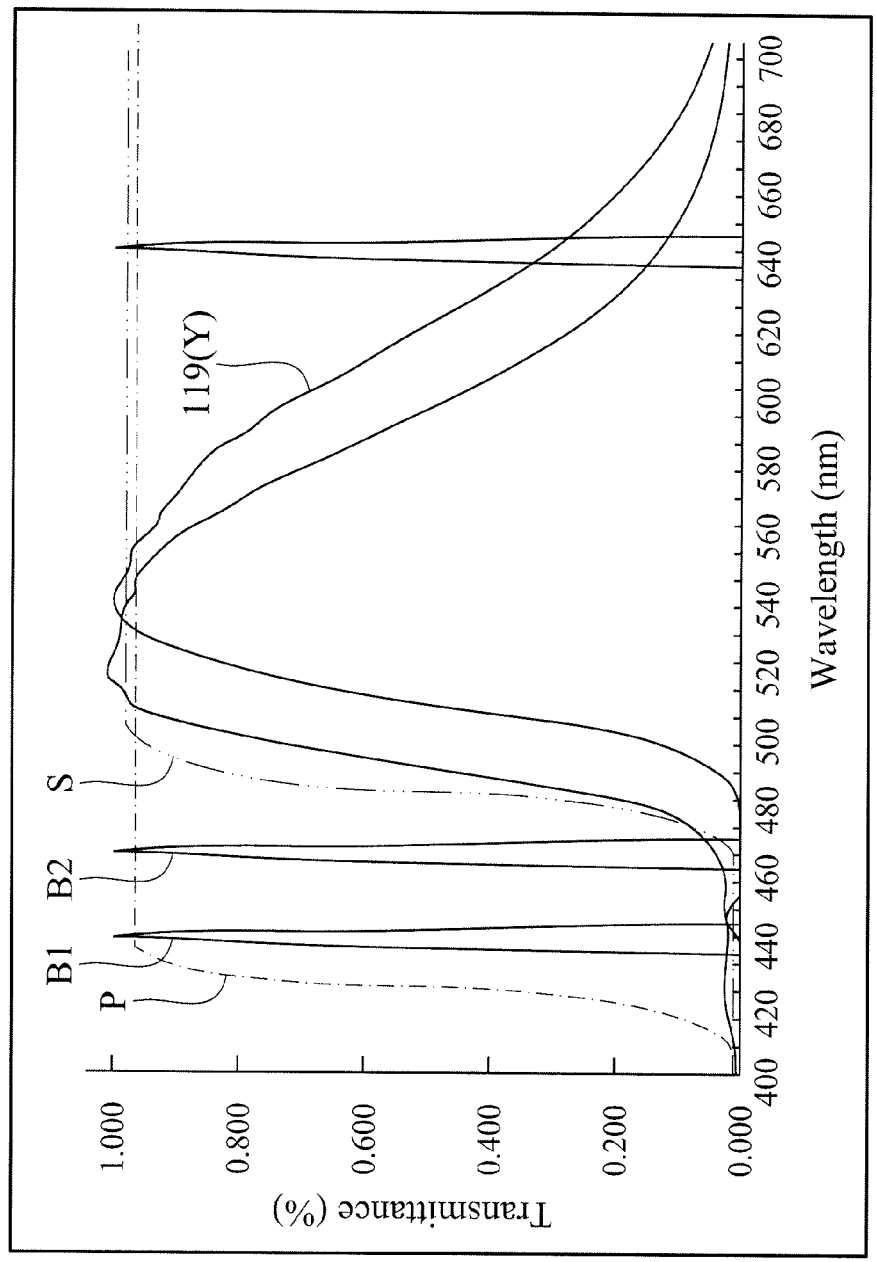
FIG. 5 is a transmission frequency spectrum of the first PBS.

FIG. 5 is a transmission frequency spectrum of the first PBS 142. The first PBS 142 has different transmission frequency spectrums for the P-polarized and the S-polarized lights. To clarify the description, the wavebands of the S-polarized first blue light B1 and second blue light B2 output from the blue light output unit 300 and the yellow light induced by the first photoinduced element 132 are labeled in FIG. 4.

The first PBS 142 reflects the lights with wavelengths lower than 485 nm, and the lights with wavelengths higher than 485 nm pass through the first PBS 142. The S-polarized first blue light B1 and second blue light B2 output from the blue light output unit 300 (first mode) is reflected by the first PBS 142, and the yellow light induced by the first photoinduced element 132 passes through the first PBS 142.

With reference to FIG. 5, the first wave plate 162 of the first optical module 122 is quarter-wave plate. After the light passes through the first plate 162, the light has a quarter-wavelength phase difference. The lens unit 180 comprises a first lens 192 and a second lens 194. The first lens 192 and the second lens 194 are arranged to focus the lights passing through the lens unit 180 on the first photoinduced element 132. Similarly, when the light is emitted from the first photoinduced element 132, the lens unit 180 guides and spreads the lights.

In the first and second modes, the light beams are guided by the first optical module 122 and the second optical model 120 toward the band filter 150. In one embodiment of the invention, the band filter 150 reflects the lights within a first waveband or a second waveband, and the lights without the first waveband and the second waveband pass through the band filter 150.

Figure 6:
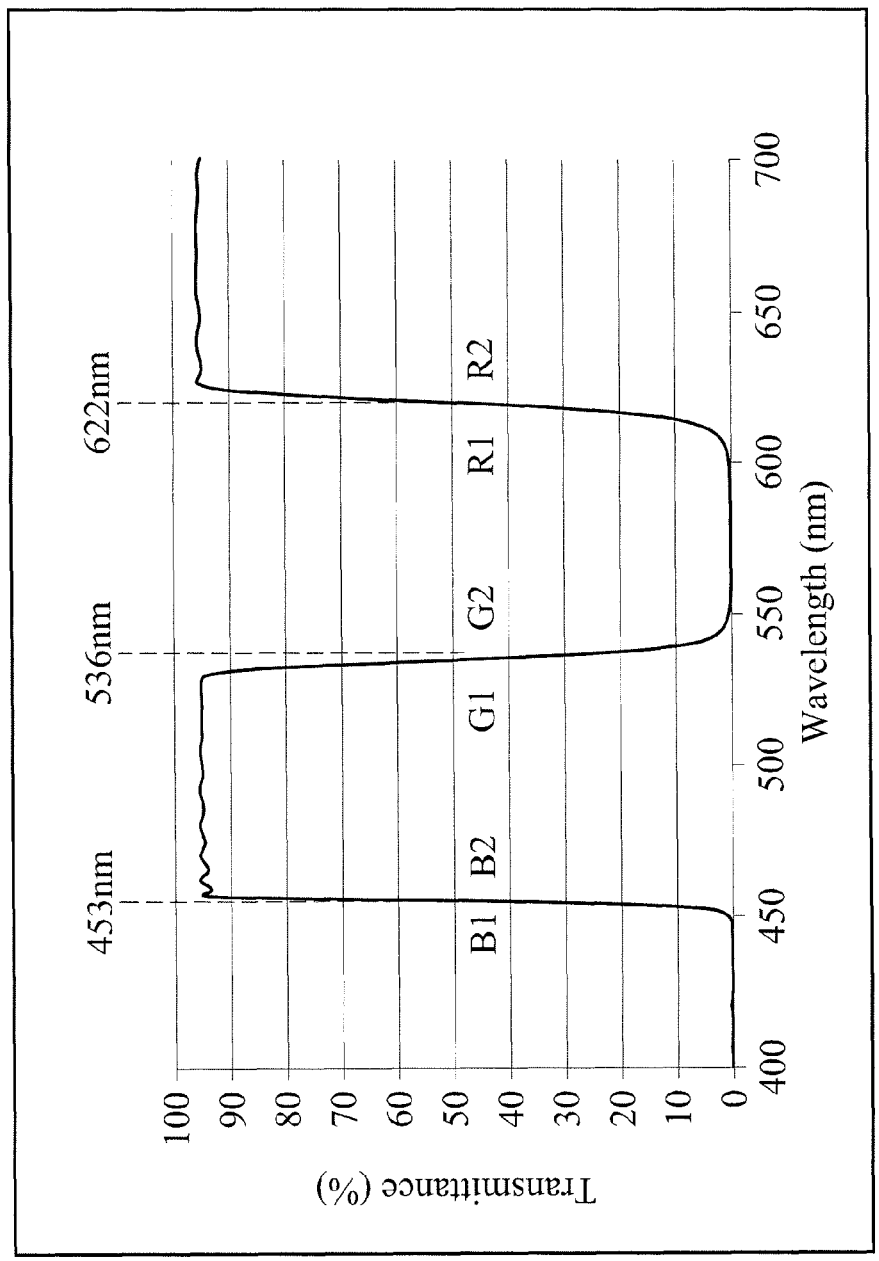
FIG. 6 is a transmission frequency spectrum of the band filter.

FIG. 6 is a transmission frequency spectrum of the band filter 150. The band filter 150 has different transmission frequency spectrums for different wavebands.

With reference to FIG. 1, the prism unit 200 comprises a first prism 204 and a second prism 202. A total reflective gap 206 is formed between the first prism 204 and the second prism 202. The prism unit 200 and the total reflective gap 206 reflect the light from the band filter 150 to a target position.

In one embodiment, the first prism 204 of the prism unit 200 is disposed between the first PBS 142 and the first wave plate 162. The first PBS 142 and the first wave plate 162 are attached to the first prism 204. The interface design between the first prism 204 and the total reflective gap 206 allows the light from the first wave plate 162 to pass through the first prism 204 and the total reflective gap 206 and travel to the band filter 150.

The characters of the elements of the six-primary solid state illuminator 100 are mentioned above, and the light paths under the first and second modes are described as follows.

[First Mode]

Figure 7:
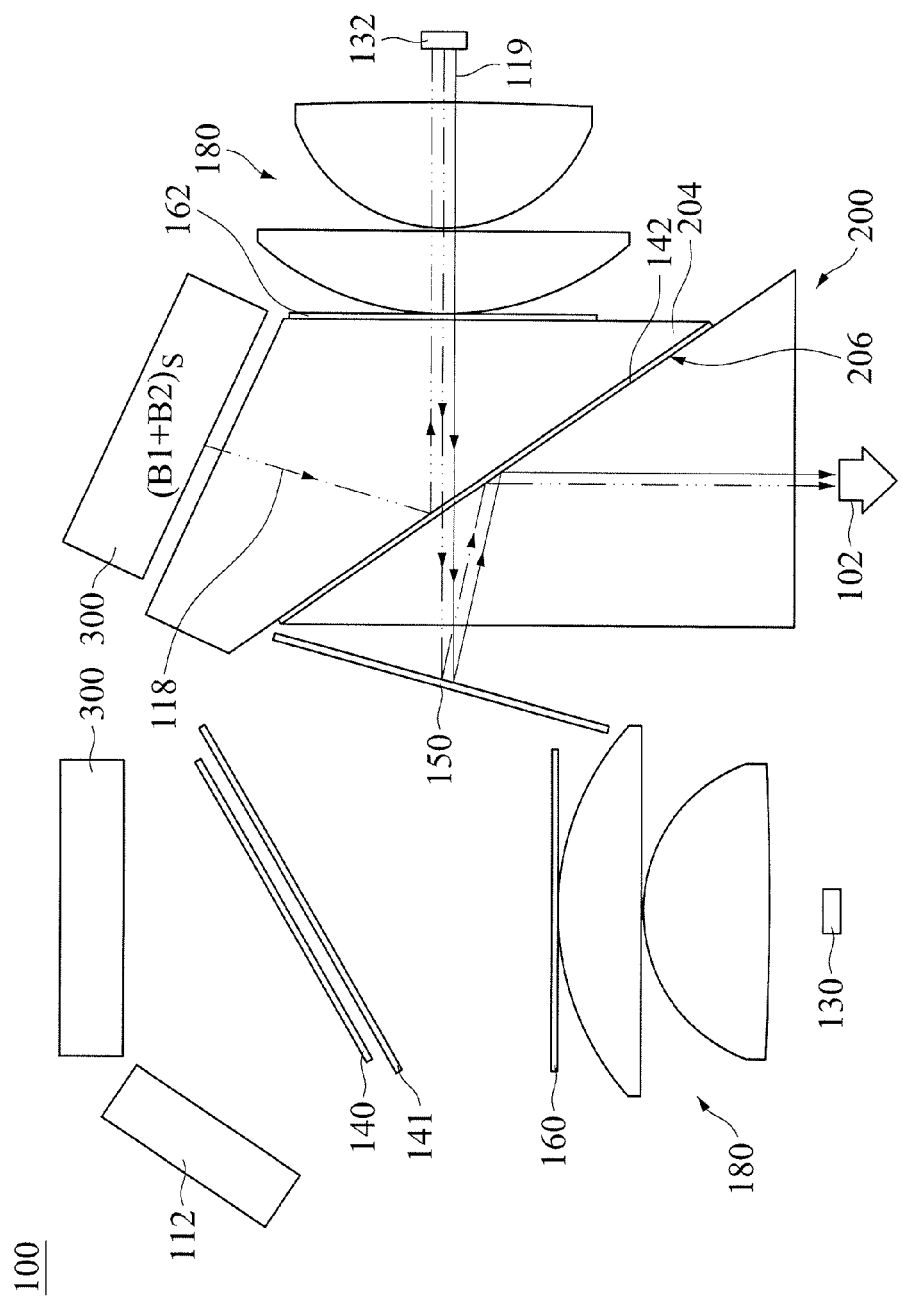
FIG. 7 shows the light path under first mode of the six-primary solid state illuminator of the embodiment of the invention.

FIG. 7 shows the light path under first mode of the six-primary solid state illuminator of the embodiment of the invention. In the drawings, the S-polarized first blue light B1 and second blue light B2 output from the blue light output unit 300 and the yellow light induced by the first photoinduced element 132 are represented by lines. A first combined light 118 includes the S-polarized first blue light B1 and second blue light B2. The yellow light 119 is induced by the first photoinduced element 132.

With reference to FIGS. 5, 6 and 7, the first combined light 118 aims at the first PBS 142. The first prism 204 of the prism unit 200 is disposed between the first PBS 142 and the first wave plate 162. The first combined light 118 relative to the first PBS 142 is S-polarized. With reference to FIG. 4, the first PBS 142 reflects the first combined light 118. The first combined light 118 is reflected by the first PBS 142, passes through the first wave plate 162, and is guided by the lens unit 180 to be focused on the first photoinduced element 132.

Then, a portion of the first combined light 118 is reflected on the first photoinduced element 132, and the other portion of the first combined light 118 induces the first photoinduced element 132 to generate the yellow light 119. The reflected first combined light 118 and the yellow light 119 travel along the injection path, and are guided and spread by the lens unit 180.

Each time the first combined light 118 passes through the first wave plate 162, the first combined light 118 has a quarter-wavelength phase difference. Before and after being reflected by the first photoinduced element 132, the first combined light 118 passes the first wave plate 162 twice, and the first combined light 118 therefore has a half-wavelength phase difference, and is transformed into P-polarized relative to the first PBS 142.

As shown in FIG. 4, the P-polarized first combined light 118 can pass through the first PBS 142. The yellow light 119 can also pass through the first PBS 142.

The first combined light 118 and the yellow light 119 from the first photoinduced element 132 therefore pass through the first PBS 142. According to one embodiment of the invention, the interface design of the first prism 204 and the total reflective gap 206 allows the first combined light 118 and the yellow light 119 to pass through, and the first combined light 118 and the yellow light 119 travel toward the band filter 150.

With reference to FIG. 6, when the first combined light 118 travels to the band filter 150, the first blue light B1 of the first combined light 118 is reflected by the band filter 150, and the second blue light B2 of the first combined light 118 passes through the band filter 150. The waveband of the yellow light 119 is from 480 nm to 700 nm. When the yellow light 119 travels to the band filter 150, the light within the waveband of 536 nm to 622 nm (including red light R1 and green light G2) is reflected by the band filter 150. The reflected first blue light B1 and the yellow light 119 compose a first primary combination (B1G2R1), and the interface between the prism unit 200 and the total reflective gap 206 guides the first primary combination (B1G2R1) from the band filter 150 toward the direction labeled by arrow 102. Therefore, the first primary combination of the six-primary solid state illuminator is provided.

[Second Mode]

Figure 8:
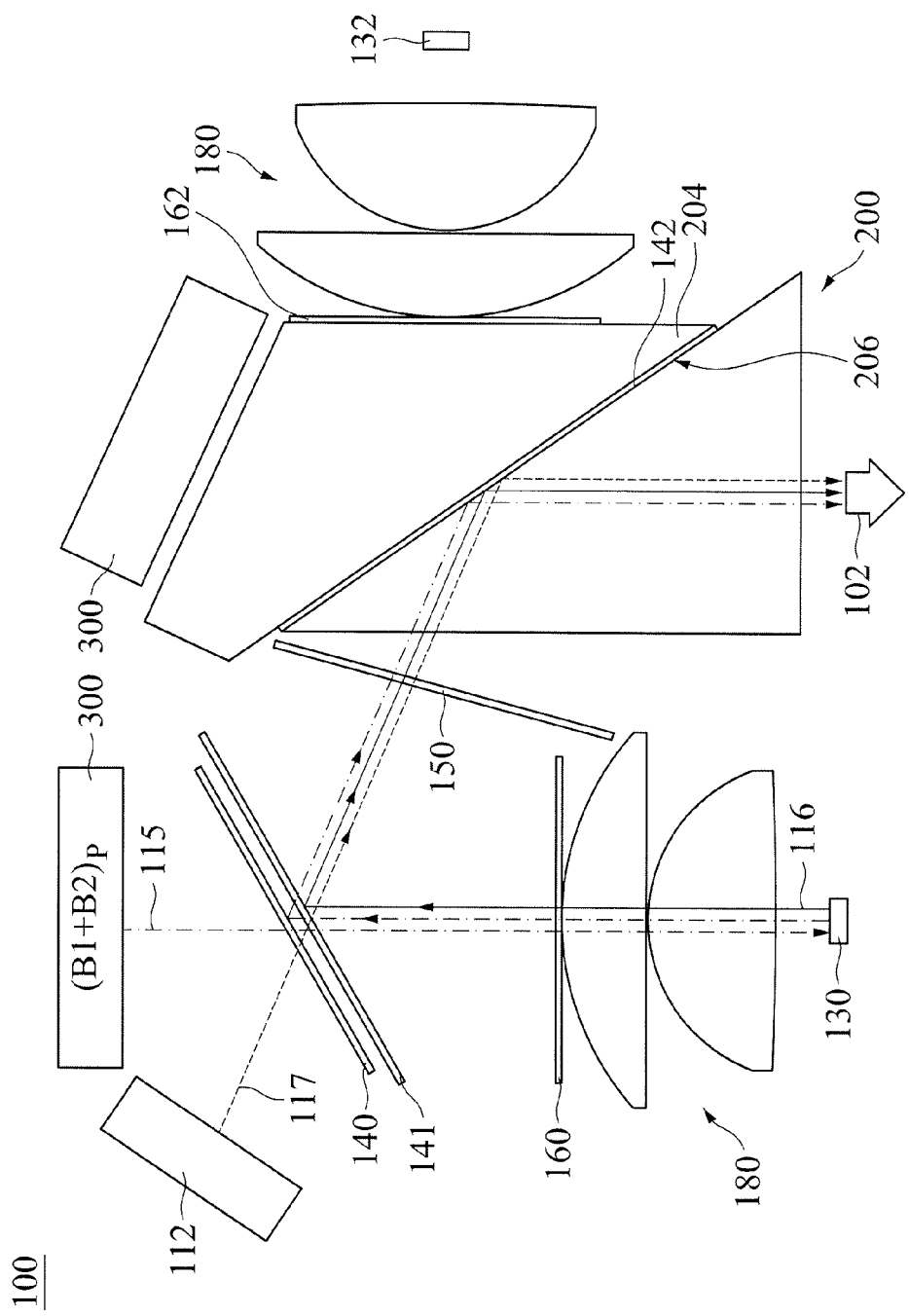
FIG. 8 shows the light path under second mode of the six-primary solid state illuminator of the embodiment of the invention.

FIG. 8 shows the light path under second mode of the six-primary solid state illuminator of the embodiment of the invention. In the drawings, the P-polarized first blue light B1 and second blue light B2 output from the blue light output unit 300, the red light 112 and the green light induced by the second photoinduced element 130 are represented by lines. A second combined light 115 includes the P-polarized first blue light B1 and second blue light B2. The green light 116 is induced by the second photoinduced element 130. The red light 117 is provided by the red light source 112.

With reference to FIGS. 3, 4, 6 and 8, the second combined light 115 and the red light 117 aim at the second PBS 140. The second combined light 115 and the red light 117 are P-polarized relative to the second PBS 140. Therefore, as shown in FIG. 3, the P-polarized second combined light 115 and red light 117 pass through the second PBS 140, and then the second combined light 115 travels toward the second photoinduced element 130, and the red light travels toward the band filter 150.

The second combined light 115 passes through the second PBS 140, the second wave plate 160 and the lens unit 180 into the second photoinduced element 130. The second combined light 115 is focused on the second photoinduced element 130 by the lens unit 180.

Then, a portion of the second combined light 115 is reflected on the second photoinduced element 130, and the other portion of the second combined light 115 induces the second photoinduced element 130 to generate the green light 116. The reflected second combined light 115 and the green light 116 travel along the injection path, and are guided and spread by the lens unit 180 to be projected to the second PBS 140.

Each time the second combined light 115 passes through the second wave plate 160, the second combined light 115 has a quarter-wavelength phase difference. Before and after being reflected by the second photoinduced element 130, the second combined light 115 passes the second wave plate 160 twice, and the second combined light 115 therefore has a half-wavelength phase difference, and is transformed into S-polarized relative to the second PBS 140.

As shown in FIG. 3, the S-polarized second combined light 115 is reflected by the second PBS 140. The green light 116 is reflected by the green light reflector 141.

The second combined light 115 and the green light 116 from the second photoinduced element 130 therefore are reflected by the second PBS 140. The second PBS 140 is not parallel to the second wave plate 160, and the reflected second combined light 115, the green light 116 and the red light 117 travel to the band filter 150 simultaneously.

In this embodiment, the arrangement of the second PBS 140 and the green light 116 prevent the PBS from malfunctioning due to angle inaccuracy.

With reference to FIG. 6, when the second combined light 115 and the red light 117 travel to the band filter 150, the first blue light B1 of the second combined light 115 is reflected by the band filter 150, and the second blue light B2 of the second combined light 115 passes through the band filter 150. The waveband of the red light (R2) 117 is from 637 nm to 641 nm, and the red light (R2) 117 therefore passes through the band filter 150.

The waveband of the green light 116 is between 470 nm and 700 nm. When the green light 116 travels to the band filter 150, the light within the waveband of 470 nm to 536 nm and greater than 622 nm passes through the band filter 150. In the green light 116, the light within the waveband greater than 622 nm is little, and the light within the waveband of 495 nm to 536 nm is the major portion (corresponding to green light area G1 of FIG. 5).

The second blue light B2, the green light 116, and the red light 117 passing through the band filter 150 compose a second primary combination (B2G1R2), and the interface between the prism unit 200 and the total reflective gap 206 guides the second primary combination (B2G1R2) from the band filter 150 toward the direction labeled by arrow 102. Therefore, the second primary combination of the six-primary solid state illuminator is provided.

The six-primary solid state illuminator of the embodiment of the invention outputs the first primary combination and the second primary combination, and each of the primary combination has blue light, red light and green light.

Utilizing the six-primary solid state illuminator of the embodiment of the invention, the first and second photoinduced elements are induced by the continuously powered first and second blue light sources, and the green light and the yellow light induced from the first and second photoinduced elements can be increased, and the system brightness is improved.

Use of ordinal tetins such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A six-primary solid state illuminator, comprising:
   a blue light output unit, continuously outputting a first blue light and a second blue light simultaneously, wherein a wavelength of the first blue light is different from a wavelength of the second blue light, wherein in a first mode, the first blue light and the second blue light are modulated into S-polarized and are output as a first combined light, and in a second mode, the first blue light and the second blue light are modulated into P-polarized and are output as a second combined light;
   a red light source, providing a red light;
   a first photoinduced element;
   a second photoinduced element;
   a first optical module;
   a second optical module;
   a band filter; and
   a prism unit,
   wherein in the first mode, the first combined light enters the first optical module, and induces the first photoinduced element to generate a yellow light, and the yellow light and the first combined light pass through the first optical module and the band filter, the yellow light and the first combined light are filtered by the band filter and become a first primary combined light, and the first primary combined light is output through the prism unit,
   wherein in the second mode, the second combined light enters the second optical module, and induces the second photoinduced element to generate a green light, and the red light, the green light and the second combined light pass through the second optical module and the band filter, the red light, the green light and the second combined light are filtered by the band filter and become a second primary combined light, and the second primary combined light is output through the prism unit.

2. The six-primary solid state illuminator as claimed in claim 1, wherein the blue light output unit comprises:
   a first blue light source, providing a first blue light;
   a first light modulation element, polarizing the first blue light;

a second blue light source, providing a second blue light, wherein a wavelength of the first blue light differs from a wavelength of the second blue light;

a second light modulation element, polarizing the second blue light;

a polarization beam splitter, comprising a first input surface a second input surface, a first output surface and a second output surface;

a first half-wave plate, corresponding to the first output surface; and a second half-wave plate, corresponding to the second output surface, wherein in the first mode, the first blue light is modulated by the first light modulation element into P-polarized, the first blue light enters the first input surface, and passes through the polarization beam splitter, and is modulated by the second half-wave plate into S-polarized, and the second blue light is modulated by the second light modulation element into S-polarized, the second blue light enters the second input surface, and is reflected by the polarization beam splitter, and the first combined light is output;

wherein in the second mode, the first blue light is modulated by the first light modulation element into S-polarized, the first blue light enters the first input surface, and is reflected by the polarization beam splitter, and is modulated by the first half-wave plate into P-polarized, and the second blue light is modulated by the second light modulation element into P-polarized, the second blue light enters the second input surface, and passes through the polarization beam splitter, and the second combined light is output.

3. The six-primary solid state illuminator as claimed in claim 1, wherein the first optical module comprises a first PBS and a first quarter-wave plate, and the first combined light entered the first optical module is reflected by the first PBS, and passes through the first quarter-wave plate to contact the first photoinduced element, and then the first combined light returns to pass through the first quarter-wave plate, and the first combined light is reflected by the first PBS.

4. The six-primary solid state illuminator as claimed in claim 1, wherein the first PBS is a blue-oriented PBS.

5. The six-primary solid state illuminator as claimed in claim 1, wherein the second optical module comprises a second PBS, a second quarter-wave plate and a green light reflector, and the second combined light entered the second optical module passes through the second PBS, the green reflector and the second quarter-wave plate to contact the second photoinduced element, and then the second combined light returns to pass through the second quarter-wave plate, and the second combined light is reflected by the second PBS.

6. The six-primary solid state illuminator as claimed in claim 5, wherein the green induced by the second photoinduced element passes through the second quarter-wave plate, and is reflected by the green light reflector.

7. The six-primary solid state illuminator as claimed in claim 5, wherein the second PBS is a wire-grid PBS.

8. The six-primary solid state illuminator as claimed in claim 1, wherein the first blue light source, the second blue light source and the red light source are laser light sources.

9. The six-primary solid state illuminator as claimed in claim 1, wherein the prism unit comprises a first prism and a second prism, and a total reflective gap is formed between the first prism and the second prism.

10. The six-primary solid state illuminator as claimed in claim 1, wherein when the first combined light contacts the band filter, the first blue light of the first combined light is reflected by the band filter and the second blue light thereof passes through the band filter, and when the second combined light contacts the band filter, the first blue light of the second combined light is reflected by the band filter and the second blue light thereof passes through the band filter.

* * * * *